United States Patent [19]

Haraguchi et al.

[11] Patent Number: 4,512,310
[45] Date of Patent: Apr. 23, 1985

[54] IGNITION TIMING CONTROL SYSTEM FOR INTERNAL COMBUSTION ENGINES

[75] Inventors: Hiroshi Haraguchi, Oobu; Ko Narita, Aichi, both of Japan

[73] Assignee: Nippondenso Co., Ltd., Kariya, Japan

[21] Appl. No.: 427,818

[22] Filed: Sep. 29, 1982

[30] Foreign Application Priority Data

Sep. 30, 1981 [JP] Japan .................. 56-155214

[51] Int. Cl.³ .............................................. F02P 5/04
[52] U.S. Cl. ........................................ 123/425; 73/35
[58] Field of Search ................ 123/425, 435, 427; 73/35

[56] References Cited

U.S. PATENT DOCUMENTS

| | | | |
|---|---|---|---|
| 4,111,035 | 9/1978 | West et al. | 73/35 |
| 4,153,020 | 5/1979 | King et al. | 123/425 |
| 4,256,072 | 3/1981 | Nakatomi et al. | 123/417 X |
| 4,282,841 | 8/1981 | Takagi et al. | 123/427 X |
| 4,354,378 | 10/1982 | Oshiage et al. | 123/425 X |
| 4,355,534 | 10/1982 | Roger | 73/35 |

Primary Examiner—Tony M. Argenbright
Attorney, Agent, or Firm—Cushman, Darby & Cushman

[57] ABSTRACT

In an ignition timing control system, a knocking detector detects a knocking of the internal combustion engine. The ignition timing control circuit includes a cylinder switching signal generator circuit for generating a cylinder switching signal in synchronism with the rotation of the engine, a plurality of integrators each corresponding to each or a plurality of cylinders for producing a reference signal in response to the noise signal produced from the knocking detector, a plurality of analog switches for changing one of the integrators into ON-state in response to the cylinder switch signal, and a comparator having an input terminal supplied with the detection signal of the knocking detector and the other input terminal supplied with an integration output signal of the integrators, said comparator producing a knocking signal which retards the ignition timing of the engine when the detection signal is larger in amplitude than the integration signal.

5 Claims, 21 Drawing Figures

IGNITION TIMING CONTROL SYSTEM FOR INTERNAL COMBUSTION ENGINES

BACKGROUND OF THE INVENTION

The present invention relates to an ignition timing control system for internal combustion engines, which has a knocking decision level for each cylinder of an internal combustion engine.

Conventional knocking feedback systems detect a knocking from vibration noises or the like of an internal combustion engine. Upon detection of a knocking signal, the ignition timing is retarded by a certain angle, while in the absence of a knocking signal for a predetermined length of time, the ignition timing is advanced by a certain angle.

The conventional knock feedback systems are such that, in detecting a knocking, it is decided that a knocking has occurred and the ignition timing is retarded when the signal produced from a knocking detector exceeds a decision level set in the knock feedback system. Generally, the knocking detector provided on the internal combustion engine detects knockings of a plurality of cylinders. The vibration of a cylinder distant from the detector is more difficult to detect than the vibration of a cylinder closer to the detector, the distant cylinder producing a smaller detection signal. In other words, the ability to detect a knocking is dependent on the position of cylinders, with the result that the controllability of the ignition timing of a cylinder distant from the knocking detector is deteriorated. The ignition timing of a cylinder distant from the knocking detector is thus excessively advanced, so that the knocking is aggravated, thereby leading to the damage of the combustion chamber and the deteriorated engine operating efficiency.

SUMMARY OF THE INVENTION

The present invention has been developed in view of the above-mentioned disadvantages, and an object thereof is to provide an ignition timing control system for internal combustion engines, comprising a knocking detector for detecting a vibration of the internal combustion engine or external vibrations based on a knocking of the internal combustion engine, an ignition timing control circuit for generating an ignition timing control signal in response to an output signal of the knocking detector, an ignitor for generating an ignition signal in response to the ignition timing control signal produced from the ignition timing control circuit; the ignition timing control circuit including a cylinder switch signal generator circuit for generating a cylinder switch signal in synchronism with the rotation of the internal combustion engine, a plurality of integrators each corresponding to each or a plurality of cylinders for producing a knock decision signal in response to the knock detection signal produced from the knocking detector, a change-over switch for interrupting one of the terminals of the integrators in response to the cylinder switch signal, and a comparator circuit having an input terminal supplied with the knocking detection signal of the knocking detector and the other input terminal supplied with an integration output signal of the integrators.

DESCRIPTION OF THE PREFERRED EMBODIMENTS

Figure 1:
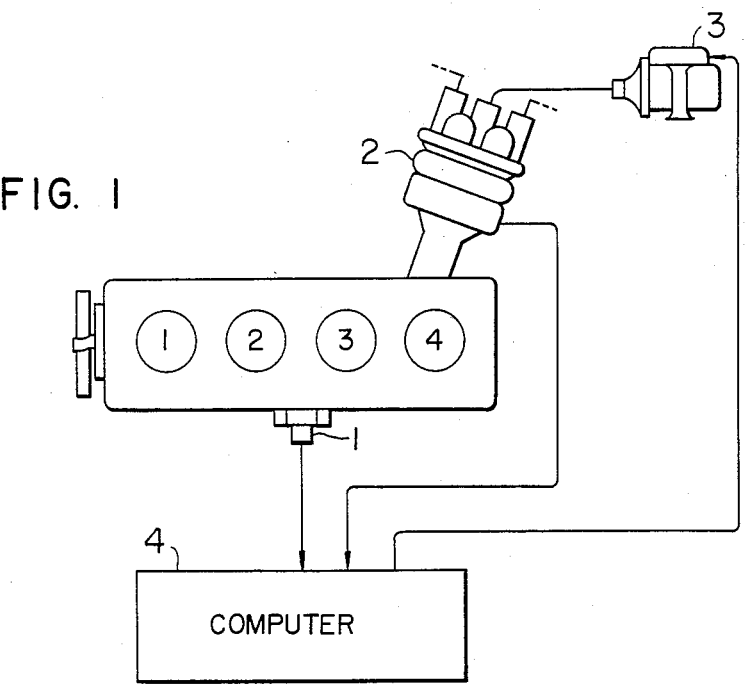
FIG. 1 is a diagram showing a general configuration of a system according to the present invention.

An ignition timing control system according to the present invention will be explained below with reference to the accompanying drawings. In FIG. 1, the ignition timing control system comprises a knock sensor 1 for detecting the vibrations, pressure and noises of a four-cylinder spark ignition engine, a distributor 2, an ignitor 3 and an ignition timing control computer 4.

The knock sensor 1 is mounted on the cylinder block between the second and third cylinders of the engine. The ignitor 3 is of a well-known transistor type and is mounted on the ignition coil.

Figure 2:
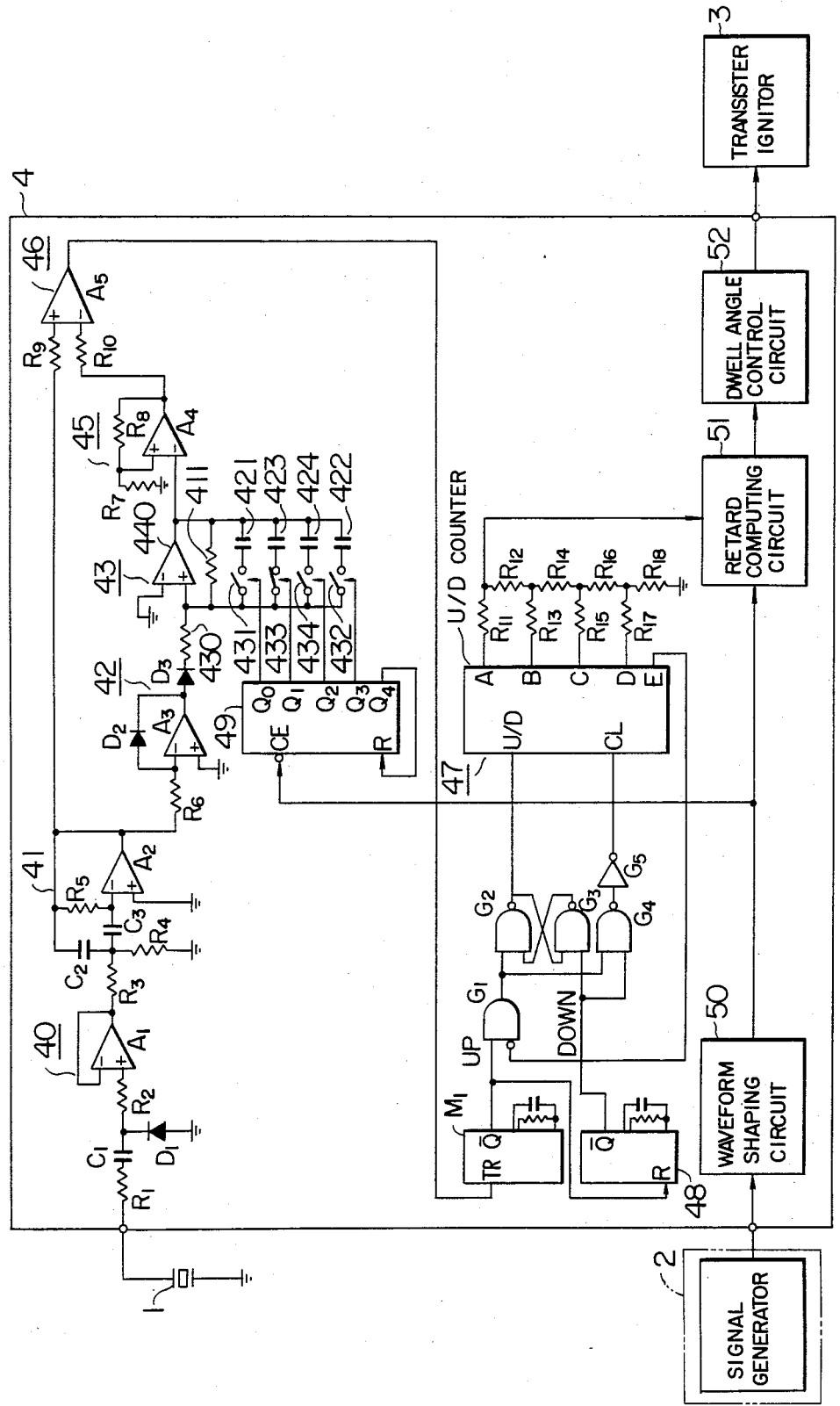
FIG. 2 is an electrical circuit diagram showing a configuration of an ignition timing control computer circuit in FIG. 1.

In FIG. 2, the computer 4 is configured as follows. Numeral 40 designates a buffer circuit including resistors $R_1$, $R_2$, a capacitor $C_1$, a diode $D_1$ and an operational amplifier $A_1$ and is impressed with a knock detection signal of the knock sensor 1. Numeral 41 designates a bandpass filter circuit including resistors $R_3$ to $R_5$, capacitors $C_2$, $C_3$ and an operational amplifier $A_2$ for removing a false actuation signal from the output signal of the buffer circuit 40. Numeral 42 designates a half-wave rectifier circuit including a resistor $R_6$, diodes $D_2$ and $D_3$ and an operational amplifier $A_3$ for half-wave rectifying the knock detection signal produced from the filter circuit 41.

An integrator 43 includes an operational amplifier 440, a resistor 411, capacitors 421 to 424 and analog switches 431 to 434. The inverting input of the operational amplifier 440 is grounded and the non-inverting input thereof is connected with a resistor 430. The resistor 411 and capacitors 421 to 424 in parallel are inserted between the non-inverting input and the output of the operational amplifier 440. The capacitors 421 to 424 are connected in series with analog switches 431 to 434 respectively. The analog switches used here are of TC4066 of Toshiba.

Numeral 45 designates an amplifier including resistors $R_7$, $R_8$ and an operational amplifier $A_4$ for amplifying the integrated output. Numeral 46 designates a comparator circuit including resistors $R_9$, $R_{10}$ and a comparator $A_5$. An input terminal of the comparator circuit 46 is supplied with the detection signal produced from the filter circuit 41, and the other input thereof is supplied with an integration signal amplified through the amplifier 45. This integration signal provides a reference signal, for a knock decision, set for each cylinder of the engine. Numeral 47 designates a counter unit for ignition timing control including a monostable multivibrator $M_1$, gates $G_1$ to $G_5$, an up/down counter and resistors $R_{11}$ to $R_{18}$ for computing the retard angle of ignition timing in accordance with the knock signal produced from the comparator circuit 46.

The monostable multivibrator $M_1$ generates a pulse about 3 msec in duration in accordance with the output signal (rise signal) of the comparator circuit 46. This pulse is applied through the NAND gates $G_2$ and $G_3$ making up a flip-flop to the U/D terminal of the up/down counter on the one hand and through the NAND gate $G_4$ and the inverter $G_5$ to the clock terminal CL on the other hand.

The up/down counter is set to count up or count down by the control signal applied to the U/D terminal thereof and thus counts the pulses applied to the clock terminal CL thereof.

More specifically, a pulse produced from the monostable multivibrator $M_1$ provides an up signal and causes the counter to count up, while a pulse generated from the advance timer 48 described later causes the counter to count down.

After counting up a predetermined number of pulses, the counter produces a "1" signal at the E terminal thereof thereby to close the gate $G_1$, thus prohibiting the input of the clock signal from the monostable multivibrator $M_1$ to the clock terminal.

Resistors $R_{11}$ to $R_{18}$, which provides a resistor circuit network, make up a type of D/A converter for converting the digital output of the up/down counter into an analog voltage.

The advance timer 48 is for advancing the ignition timing in the absence of a knock and produces a pulse at intervals of predetermined time, say, 0.8 msec, by which the up/down counter is caused to count down.

The monostable multivibrator $M_1$ is of TC4047 of Toshiba used in monostable mode and the pulse duration thereof is set by an external resistor and a capacitor. On the other hand, the advance timer 48 is of TC4047 of Toshiba used in a stable mode and is wired to be reset by the output of the monostable multivibrator $M_1$.

A ring counter 49 for switching the cylinders is of TC4028 of Toshiba and generates an operating signal for the analog switches 431 to 434 in accordance with the expansion stroke of the cylinders.

Figure 3:
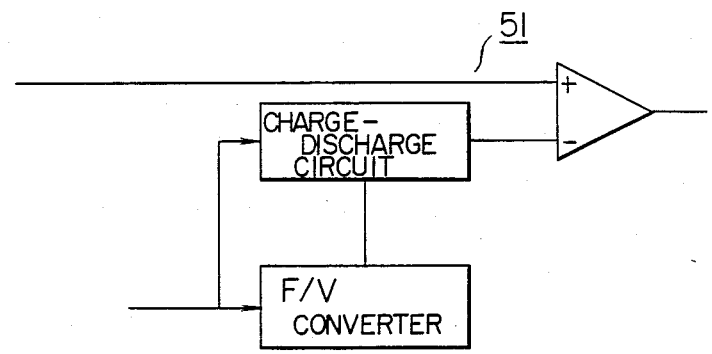
FIG. 3 is a circuit diagram showing a configuration of a retard angle computing circuit in FIG. 2.

A waveform shaping circuit 50 is for shaping the waveform of a signal produced from a signal generator contained in the distributor 2. The signal generator produces a signal synchronous with the engine rotation. A reference ignition signal produced from the circuit 50 is applied to the ring counter 49 for operating the analog switches corresponding to the respective cylinders of the internal combustion engine. Numeral 51 designates a retard computing circuit including a F/V converter, a capacitor charge-discharge circuit and a comparator as shown in FIG. 3 for computing the retardation of the reference ignition signal produced from the waveform shaping circuit 50, on the basis of the control signal produced from the counter unit 47. Numeral 52 designates a dwell angle control circuit for controlling the dwell angle of the ignitor 3 by the retard ignition signal produced from the retard computing circuit 51.

Figure 4:
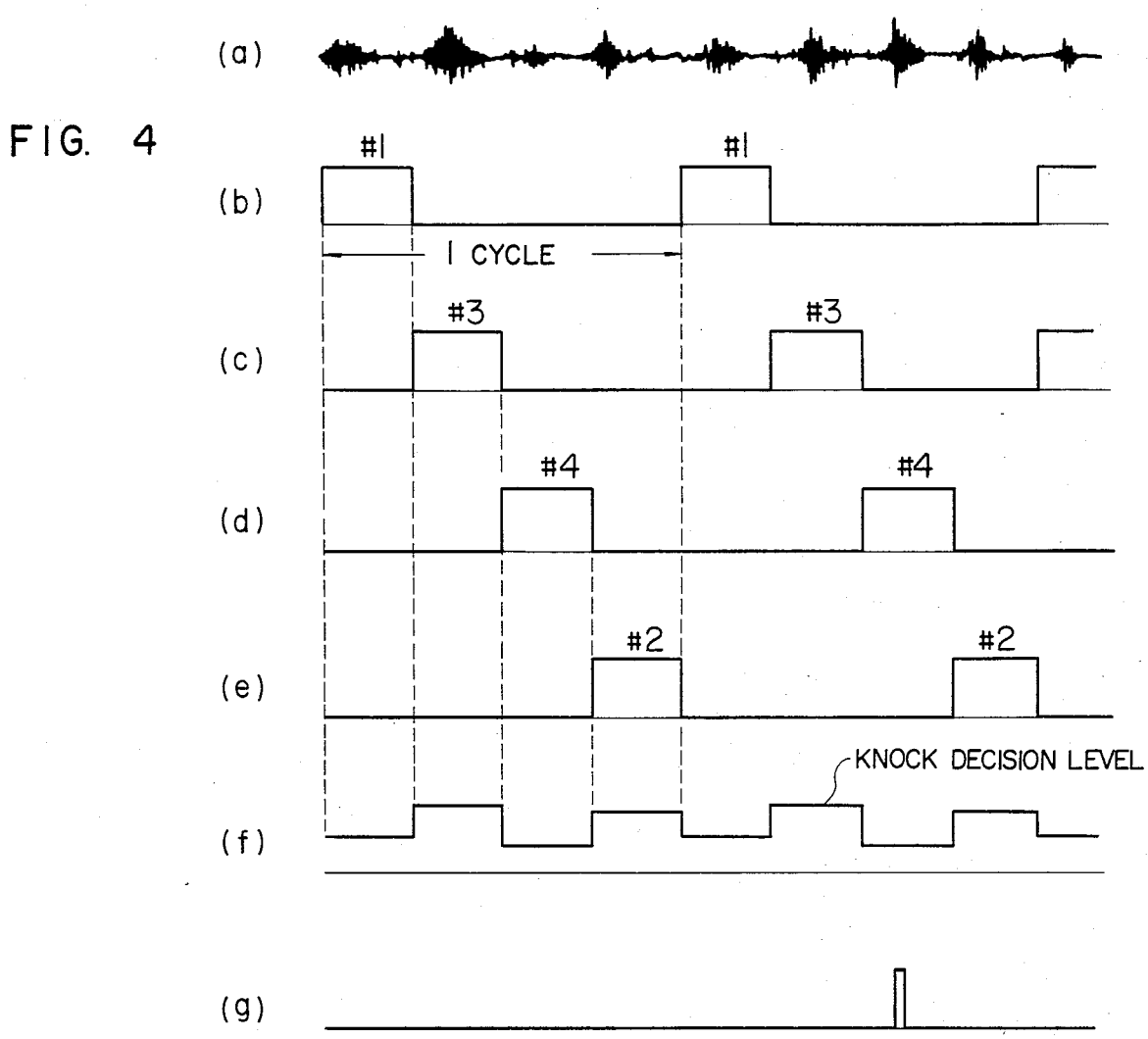
FIGS. 4(a) to 4(g) are timing charts for explaining the operation of a system according to the present invention.

The operation of the system according to the present invention will be described with reference to the timing chart of FIG. 4. The knock detection signal (FIG. 4(a)) produced from the knock sensor 1 is applied through the buffer circuit 40 and the filter circuit 41 to the compared input of the comparator circuit 46. On the other hand, the knock detection signal applied through the buffer circuit 40 and the filter circuit 41 is half-wave rectified through the half-wave rectifier circuit 42 and is applied to the integrator 43. The integrated output (FIG. 4(f)) of the integrator 43 is applied through the amplifier 45 to the reference signal input of the comparator circuit 46. The comparator circuit 46 compares this reference signal with the knock detection signal applied to the compared input terminal, thereby producing a predetermined comparison signal showing the presence or absence of a knock.

Specifically, when the knock detection signal exceeds the reference signal, the output signal of the comparator circuit 46 changes from "0" to "1" level, so that the signal of FIG. 4(g) showing the presence of a knock is produced from the monostable multivibrator $M_1$.

The first output signal (FIG. 4(b)) of the ring counter 49 is produced in synchronism with the ignition of the first cylinder of the internal combustion engine. In similar fashion, the second output signal (FIG. 4(c)), the third output signal and the fourth output signal are produced in synchronism with the ignition of the third, fourth and second cylinders of the engine respectively. Upon the ignition of the first cylinder of the internal combustion engine, the signal is produced only at the first output of the ring counter 49, and the switch 431 is closed, the other switches remaining open. In similar manner, upon the sequential ignition of the third, fourth and second cylinders of the engine, signals are produced at the second, third and fourth outputs of the ring counter 49 respectively, thus closing the switches 433, 434 and 432 sequentially. By sequentially operating the switches for cylinders in this manner, the sensor signals produced at the time of combustion or expansion stroke of each cylinder are stored in the four capacitors respectively.

The reference level for deciding the presence of a knock of the first cylinder thus corresponds to a voltage integrated or averaged by the capacitor 421. The reference levels for the second, third and fourth cylinders are also set by the voltage integrated or averaged by the capacitors 422, 423 and 424 respectively.

In this way, the reference level is set independently for each cylinder. At the time of combustion of the second and third cylinders positioned near to the knock sensor 1, the output signal of the knock sensor 1 is high, and therefore the reference levels for knock decision for the second and third cylinders are high as shown in FIG. 4(f).

At the time of combustion of the first or fourth cylinder distant from the knock sensor 1, on the other hand, the output signal of the knock sensor 1 is comparatively low, and therefore the reference level for the first and fourth cylinders is low as shown in FIG. 4(f).

In other words, the reference level changes with the relative positions of the knock sensor and the cylinder, thus making it possible to detect a knocking accurately without regard to the position of the cylinder involved.

Figure 5:
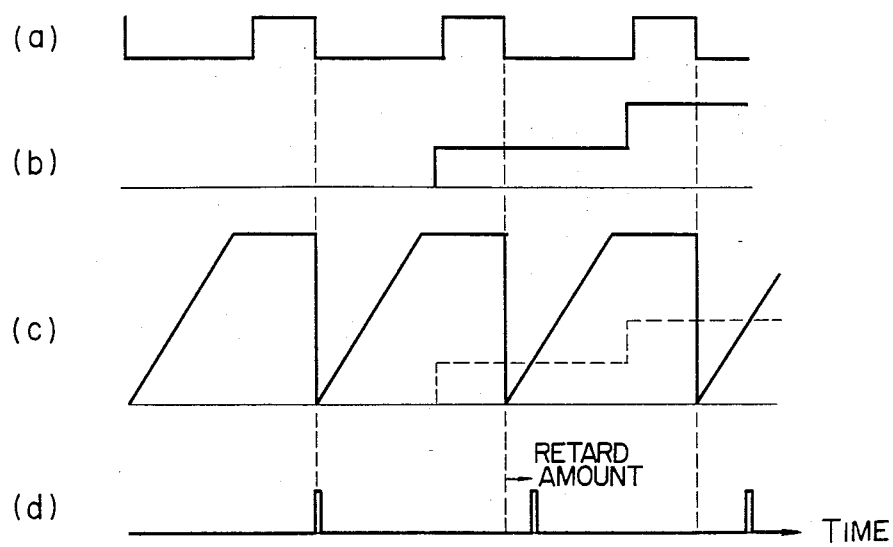
FIGS. 5(a) to 5(d) show signal waveforms produced at the essential parts of the retard angle computing circuit in FIG. 3.

The knock pulse signal produced from the monostable multivibrator $M_1$ is applied as an up signal to the U/D terminal and CL terminal of the counter 47. In response to each pulse, the counter 47 counts up by one. The counter 47 is also supplied with a down pulse at predetermined intervals of time from the advance timer 48, and in the absence of a knock pulse signal representing a knock for a predetermined length of time, counts down by one. The count output (proportional to the retard angle from the basic advance characteristic of the distributor 2) of this counter is applied to a retard computing circuit 51. The retard computing circuit 51 computes the output of the ignition timing control counter 47 as a retardation from the basic ignition signal of the distributor 2. Specifically, the retard computing circuit 51 F/V-converts the signal (FIG. 5(a)) obtained by waveform-shaping the pickup signal from the distributor 2 by the circuit 50, and charges the capacitor of the charge-discharge circuit in accordance with the voltage thus F/V-converted. Thus, with the increase in engine speed, the charge current is increased to increase the inclination of the charge voltage (FIG. 5(c)). This charge voltage is compared with the output (FIG. 5(b)) of the ignition timing control counter 47 at a comparator, so that an ignition timing signal corresponding to the retardation is produced as shown in FIG. 5(a).

Figure 6:
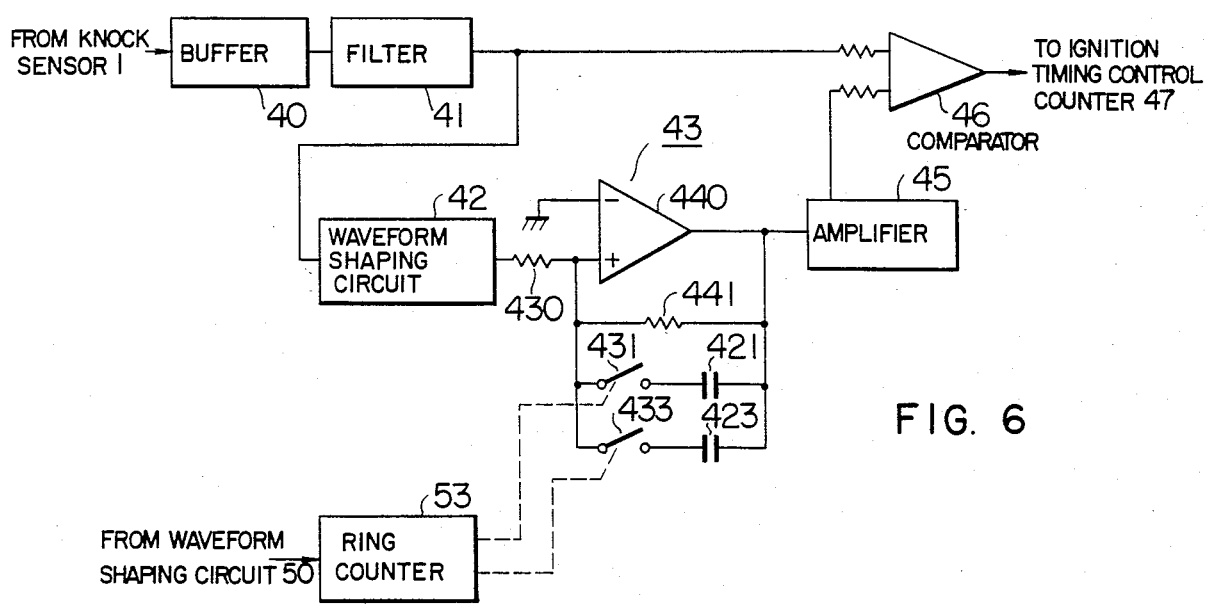
FIG. 6 is an electrical circuit diagram showing another configuration of the ignition timing control computer circuit in FIG. 1.
Figure 7:
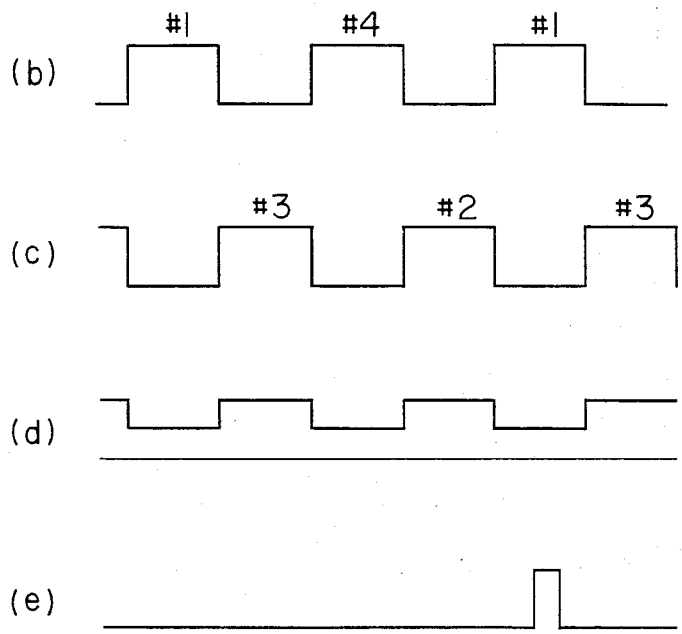
FIGS. 7(a) to 7(e) are timing charts for explaining the operation of the computer circuit of FIG. 6.

In FIG. 6 showing another embodiment of the computer according to the present invention, the integrators for the cylinders having the same knock detectability are combined thereby to reduce the number of the integrators as compared with the number of cylinders. As a result, only two capacitors 421 and 423 and changeover switches 431 and 433 are provided, so that the changeover switches are operated at timings corresponding to the first and fourth cylinders combined and the second and third cylinders combined respectively, by the signals (FIGS. 7(b) and 7(c)) of the ring counter 53. FIGS. 7(d) and 7(e) show an integration output and a comparison output respectively. Instead of providing two integrators and change-over switches respectively for a four-cylinder internal combustion engine as in the embodiment under consideration, the integrators and change-over switches may combined in other numbers.

Figure 8:
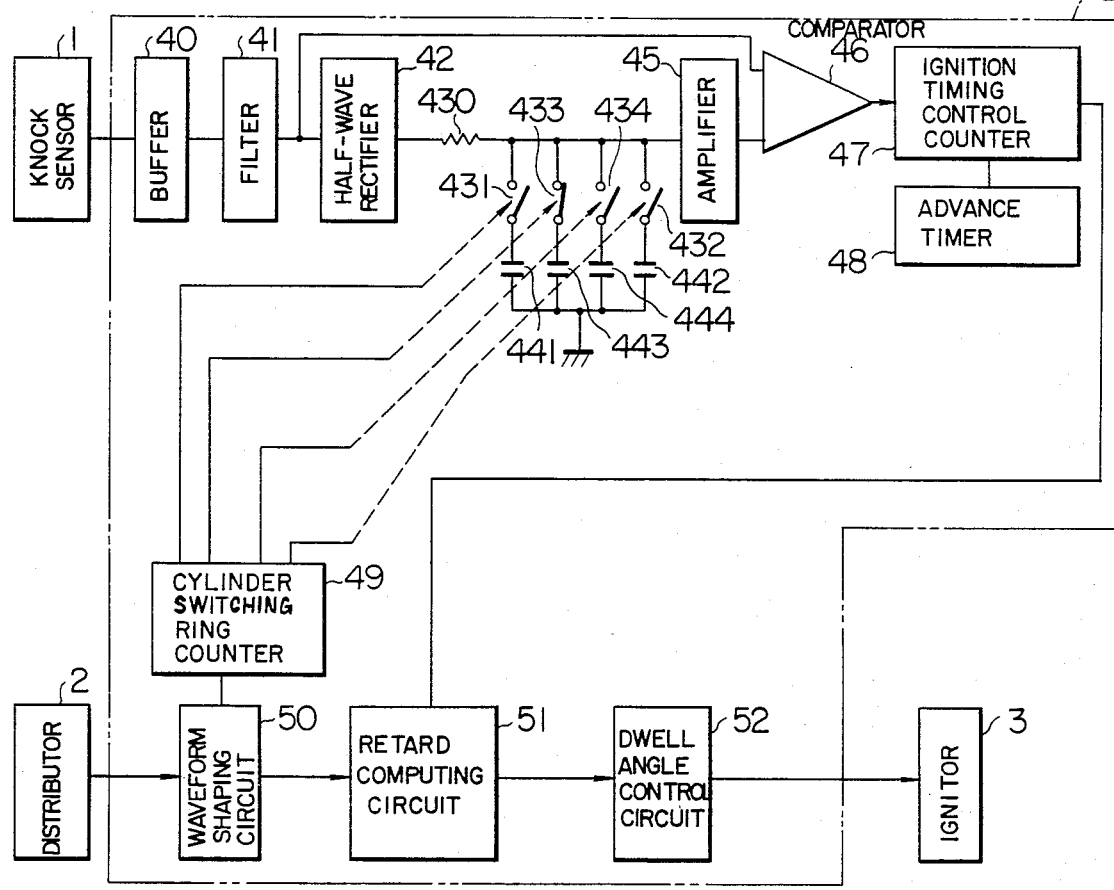
FIG. 8 is an electrical circuit diagram of a further configuration of the computer circuit in FIG. 1.

Further, as shown in FIG. 8 of still another embodiment of the computer, the operational amplifier of the integrator 43 may be omitted and an end of the capacitor may be grounded.

We claim:

1. An ignition timing control system for internal combustion engines including a knocking detector for detecting the knocking of the internal combustion engine caused, a control unit for generating an ignition timing control signal in accordance with an output signal produced from said knocking detector, and an ignitor for generating an ignition signal in response to the ignition timing control signal, wherein said control unit comprises a cylinder switching signal generator for generating a cylinder switching signal in synchronism with the rotation of the engine, a plurality of integrating means corresponding in number to a group of cylinders for generating reference signals in response to the signal produced from said knocking detector, switching means for selecting one of the reference signals of said integrating means in response to said cylinder switching signal, and comparing means for deciding the presence or absence of a knock in response to the signal produced from said knock detector and the selected one of the reference signals produced from said integrating means.

2. A system according to claim 1 wherein said integrating means includes an operational amplifier having an inverting terminal and a non-inverting terminal, a resistor connected between the non-inverting terminal and an output terminal of said operational amplifier, and a plurality of series-circuits consisting of a switch and a capacitor each connected in parallel with said resistor.

3. A system according to claim 2 wherein said integrating means further comprises a ring counter responsive to a combustion stroke of the engine to successively provide a switching signal to said switch.

4. A system according to claim 1 wherein said integrating means includes a plurality of series-circuits consisting of a capacitor and an analog switch, one end of each series-circuit being connected to an earth potential point, and a ring counter responsive to a combustion stroke of the engine to successively provide a switching signal to said analog switch.

5. A system according to claim 1, wherein the voltage level of the selected reference signal, corresponding to one of said cylinders, depends on the proximity of said one of said cylinders to the knocking detector.

* * * * *